United States Patent
Yu (10) Patent No.: US 12,515,307 B2
(45) Date of Patent: Jan. 6, 2026

(54) POWER TOOL SYSTEM

(71) Applicant: Globe (Jiangsu) Co., Ltd., Changzhou (CN)

(72) Inventor: Xinxin Yu, Changzhou (CN)

(73) Assignee: Globe (Jiangsu) Co., Ltd., Changzhou (CN)

(*) Notice: Subject to any disclaimer, the term of this patent is extended or adjusted under 35 U.S.C. 154(b) by 0 days.

(21) Appl. No.: 17/541,184

(22) Filed: Dec. 2, 2021

(65) Prior Publication Data

US 2022/0176537 A1  Jun. 9, 2022

(30) Foreign Application Priority Data

Dec. 4, 2020  (CN) .......................... 202011398276.1
Dec. 4, 2020  (CN) .......................... 202022869568.0

(51) Int. Cl.
*B25F 3/00*   (2006.01)
*A01G 3/053*  (2006.01)

(52) U.S. Cl.
CPC ................ *B25F 3/00* (2013.01); *A01G 3/053* (2013.01)

(58) Field of Classification Search
CPC .... A01G 3/085; B23B 29/244; B23B 51/126; B25F 1/02; B25F 3/00; H02K 5/225; H01R 13/631
See application file for complete search history.

(56) References Cited

U.S. PATENT DOCUMENTS

2016/0227694 A1*  8/2016  Bermudez .............. A01D 42/00
2021/0122023 A1*  4/2021  Yao ........................ H02K 5/225

FOREIGN PATENT DOCUMENTS

| CN | 108475743 A | 8/2018 |
| CN | 209189334 U | 8/2019 |
| CN | 213816674 U | 7/2021 |
| EP | 3393723 A1 | 10/2018 |
| TW | 202116148 A | 5/2021 |

* cited by examiner

*Primary Examiner* — Daniel Jeremy Leeds (57) ABSTRACT

A power tool system includes a first power tool and a second power tool. The first power tool includes a first connecting rod having a first working assembly, a second connecting rod having a first battery assembly, a first connector having a first connector portion with terminals A, B and C and a second connector portion with terminals A', B' and C'. The second power tool includes a third connecting rod with a second working assembly, a fourth connecting rod with a second battery assembly and a second connector with a same structure as the first connector; voltages of the first and second battery assemblies are different; terminals A, B are connected with first working assembly, and terminals A', B' are connected with first battery assembly; and terminals B, C are connected with second working assembly, and terminals B', C' are connected with second battery assembly.

15 Claims, 11 Drawing Sheets

POWER TOOL SYSTEM

CROSS REFERENCE TO RELATED APPLICATION

The present application is related to and claims the benefit from Chinese patent applications: serial No. 202011398276.1, filed on Dec. 4, 2020 and serial No. 202022869568.0, filed on Dec. 4, 2020, the disclosure of which is hereby incorporated by reference herein in its entirety for all purposes.

TECHNICAL FIELD

The disclosure relates to a power tool system.

BACKGROUND

Pole saw and pole hedge trimmer products typically place a motor at the head end, while a power source such as a battery assembly is placed at the handle end. For ease of carrying and storage, the extension rod is usually designed as a folding type or a multi-section detachable type. And a wire penetrates through the inside of the rod body, and the insertion position is electrically connected through an electric connector. Meanwhile, pole saw and pole hedge trimmer usually have various voltage configurations according to different requirements of customers, such as: 24V, 40V, 48V. In order to reduce the design cost, production cost and storage cost of products, pole saw and pole hedge trimmer with different voltage configurations usually share one platform, for example: operating rod, electrical connector. However, such an arrangement would result in the interposition of the operating rod of the motor provided with different input voltages and the operating rod of the battery assembly provided with different output voltages, thereby causing damage to the machine.

It is necessary to provide a new power tool system to solve the above-mentioned problems.

SUMMARY

The disclosure provides a power tool system. Two electric tools of the power tool system can not only share the same platform, thereby reducing the design cost, production cost and storage cost, but also the electric tools of different voltages will not be energized by plugging in each other so as to avoid the problem of damage to the power tool due to incorrect insertion.

The disclosure provides a power tool system, the power tool system includes a first power tool and a second power tool. The first power tool includes a first connecting rod, a second connecting rod and a first connector. One end of the first connecting rod is provided with a first working assembly; one end of the second connecting rod is provided with a first battery assembly; the first connector includes a first connector portion arranged at an end, far away from the first working assembly, of the first connecting rod and a second connector portion arranged at an end, far away from the first battery assembly, of the second connecting rod. The second power tool includes a third connecting rod, a fourth connecting rod, and a second connector with a same structure as the first connector. One end of the third connecting rod is provided with a second working assembly; one end of the fourth connecting rod is provided with a second battery assembly; the second connector includes a first connector portion arranged at an end, far away from the second working assembly, of the third connecting rod and a second connector portion arranged at an end, far away from the second battery assembly, of the fourth connecting rod. The first connector portion includes at least A, B and C three terminals, and the second connector portion includes A', B', C' terminals corresponding to the A, B and C terminals; voltages of the first and second battery assemblies are different; the terminals A and B of the first connector are electrically connected with the first working assembly, and the terminals A' and B' are electrically connected with the first battery assembly; the terminals B and C of the second connector are electrically connected with the second working assembly, and the terminals B' and C' are electrically connected with the second battery assembly.

As a further improvement of the disclosure, a connection of any two of the A, B, and C terminals constitutes an isosceles triangle, and the triangle is not an equilateral triangle.

As a further improvement of the disclosure, a connection of any two of the A, B, and C terminals forms a triangle, and the triangle is a non-rotationally symmetrical figure.

As a further improvement of the disclosure, at least one of the A, B, and C terminals is different in size from the other terminals.

As a further improvement of the disclosure, the first connector portion includes a first insulating body, and the first insulating body is provided with a first receiving groove for receiving the second connector portion; the first receiving groove is a non-rotationally symmetrical figure with respect to an axis of the first connecting rod.

As a further improvement of the disclosure, the first connector portion is provided with a first limiting member, and the second connector portion is provided with a second limiting member; the first limiting member and the second limiting member are matched, so that the connection mode of the first connector portion and the second connector portion is unique.

As a further improvement of the disclosure, the first connector portion includes a first insulating body, and the first insulating body is provided with a first receiving groove for receiving the second connector portion; the first limiting member is arranged in the first receiving groove.

As a further improvement of the disclosure, the first limiting member is a partition plate, and the partition plate divides the first receiving groove into a plurality of receiving cavities, each receiving cavity accommodating only one terminal; the second limiting member is a positioning groove matched with the partition plate.

As a further improvement of the disclosure, the voltage of the first battery assembly and the voltage of the second battery assembly are any two of 24V, 40V, and 48V.

As a further improvement of the disclosure, the first power tool is a pole-type electric saw, and the second power tool is a pole-type trimmer.

As a further improvement of the disclosure, the power tool system further includes a third power tool. The third power tool includes a fifth connecting rod, a sixth connecting rod and a third connector. One end of the fifth connecting rod is provided with a third working assembly, one end of the sixth connecting rod is provided with a third battery assembly, and the third connector is the same in structure as the first connector; the third connector includes a first connector portion arranged at one end, far away from the third working assembly, of the fifth connecting rod and a second connector portion arranged at one end, far away from the third battery assembly, of the sixth connecting rod. The A and C terminals of the third connector are electrically connected with the third working assembly, and the A' and C' terminals are electrically connected with the third battery assembly.

The disclosure further provides a power tool system, the power tool system includes: a first connecting rod provided with a first working assembly at one end thereof; a second connecting rod provided with a first battery assembly at one end thereof; and a connector. The connector includes a first connector portion arranged on an end of the first connecting rod, and a second connector portion arranged on an end of the second connecting rod. The first connector portion includes at least A, B, and C three terminals, and the second connector portion includes A', B', and C' terminals corresponding to the A, B, and C terminals, the A and B terminals of the first connector are electrically connected to the first working assembly, and the A' and B' terminals are electrically connected to the first battery assembly.

As a further improvement of the disclosure, the first connector portion and the second connector portion are connected in a unique manner.

As a further improvement of the disclosure, at least one terminal is not electrically connected.

The beneficial effect of the disclosure is that the two electric tools of the power tool system of the disclosure can not only share the same platform, thereby reducing design costs, production costs and storage costs, but also the electric tools of different voltages will not be energized by plugging in each other so as to avoid the problem of damage to the power tool due to incorrect insertion.

DETAILED DESCRIPTION

In order to make the objectives, technical solutions and advantages of the disclosure clearer, the disclosure will be described in detail below with reference to the accompanying drawings and specific embodiment.

Figure 1:
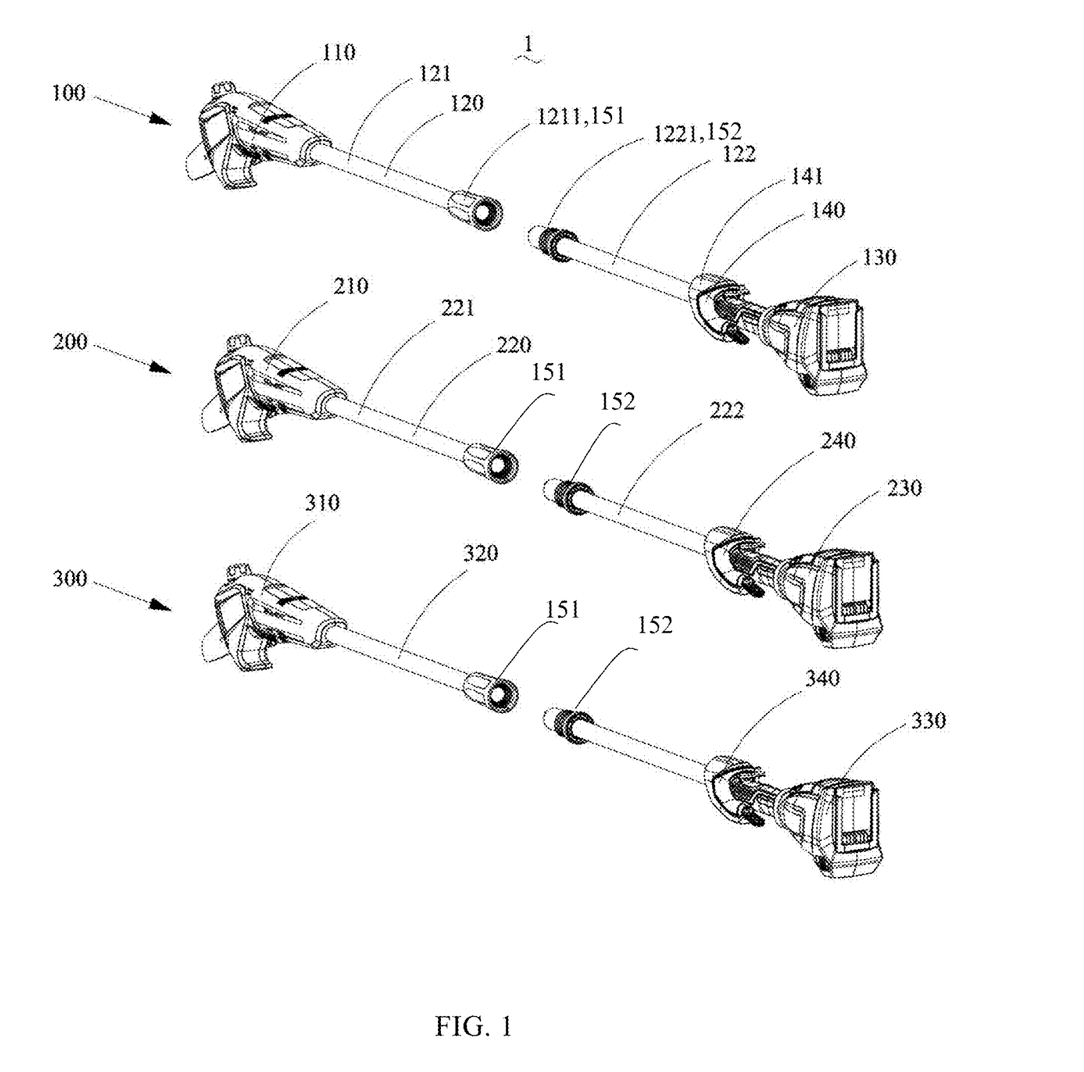
FIG. 1 is a schematic diagram of a power tool system of the disclosure.
Figure 2:
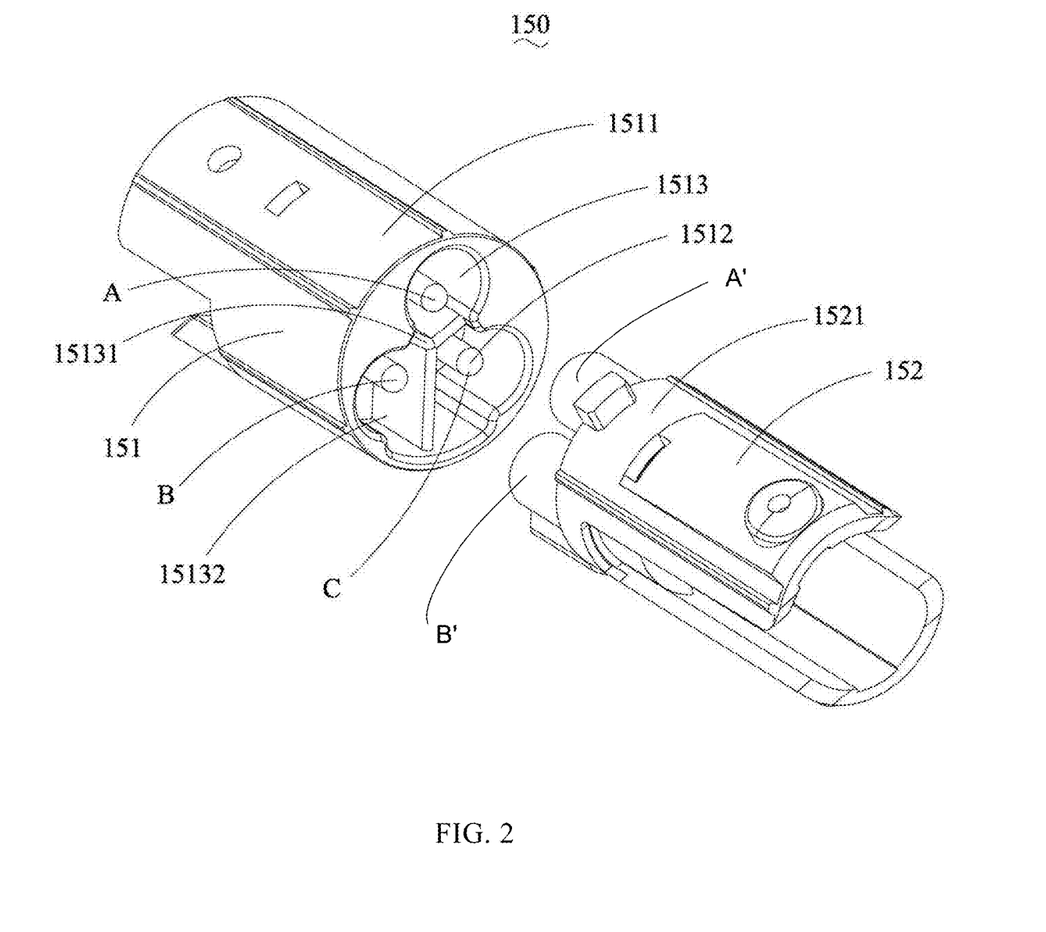
FIG. 2 is a schematic diagram of a first connector.
Figure 2A:
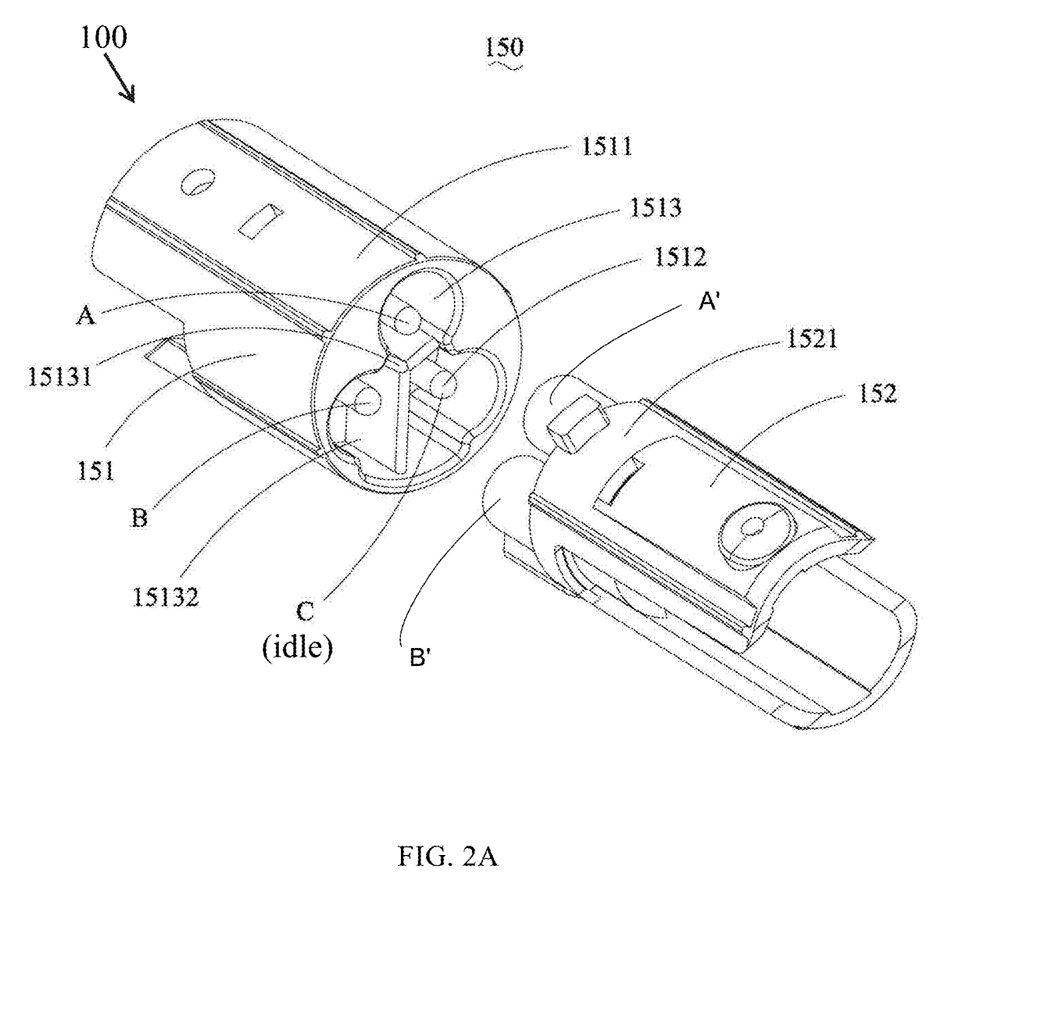
Figure 2B:
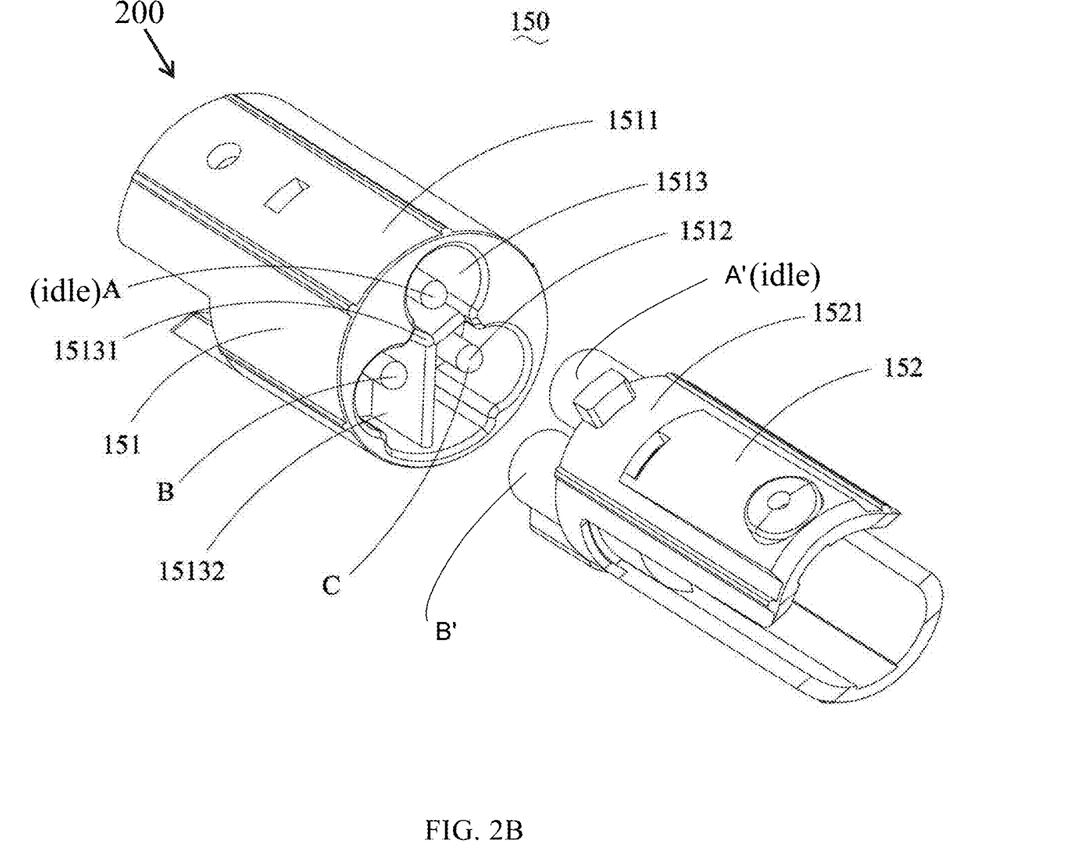
Figure 2C:
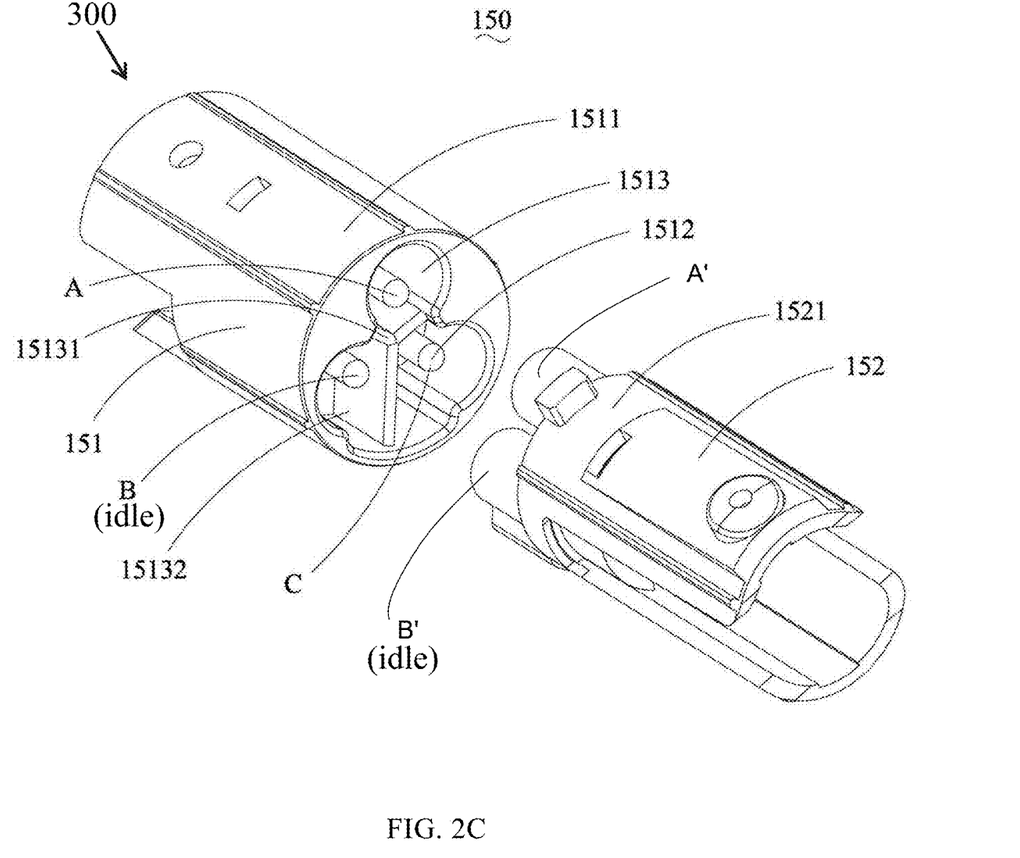
Figure 3:
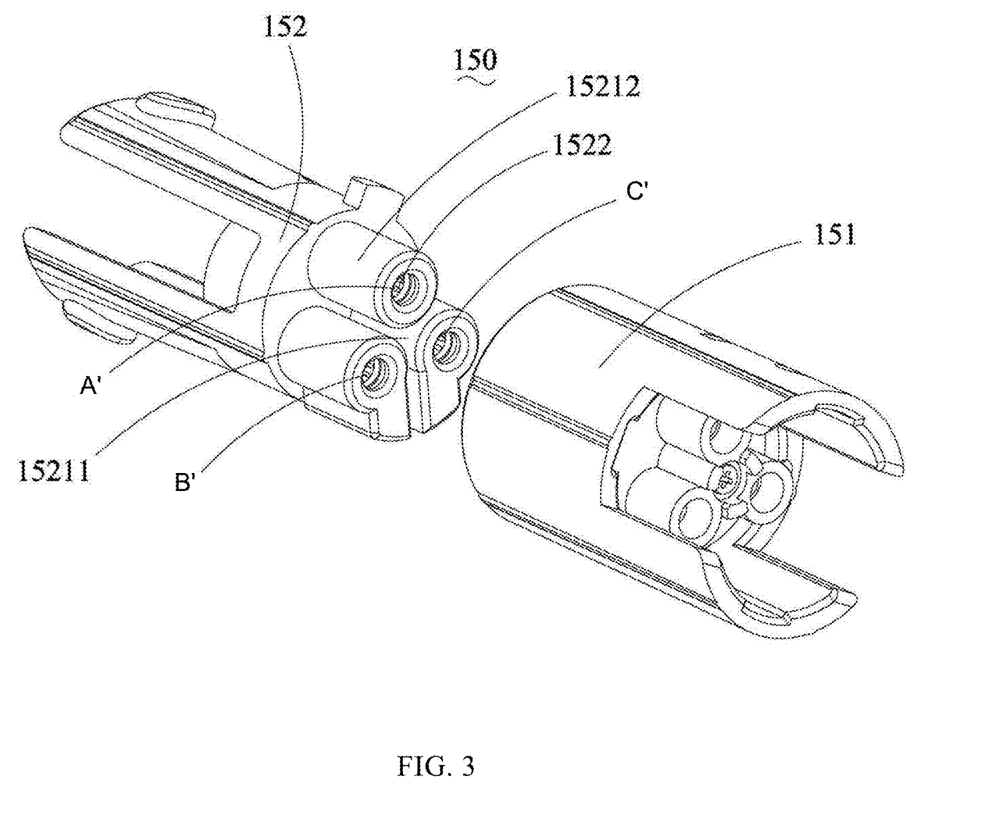
FIG. 3 is a schematic view of the first connector from another angle.
Figure 3A:
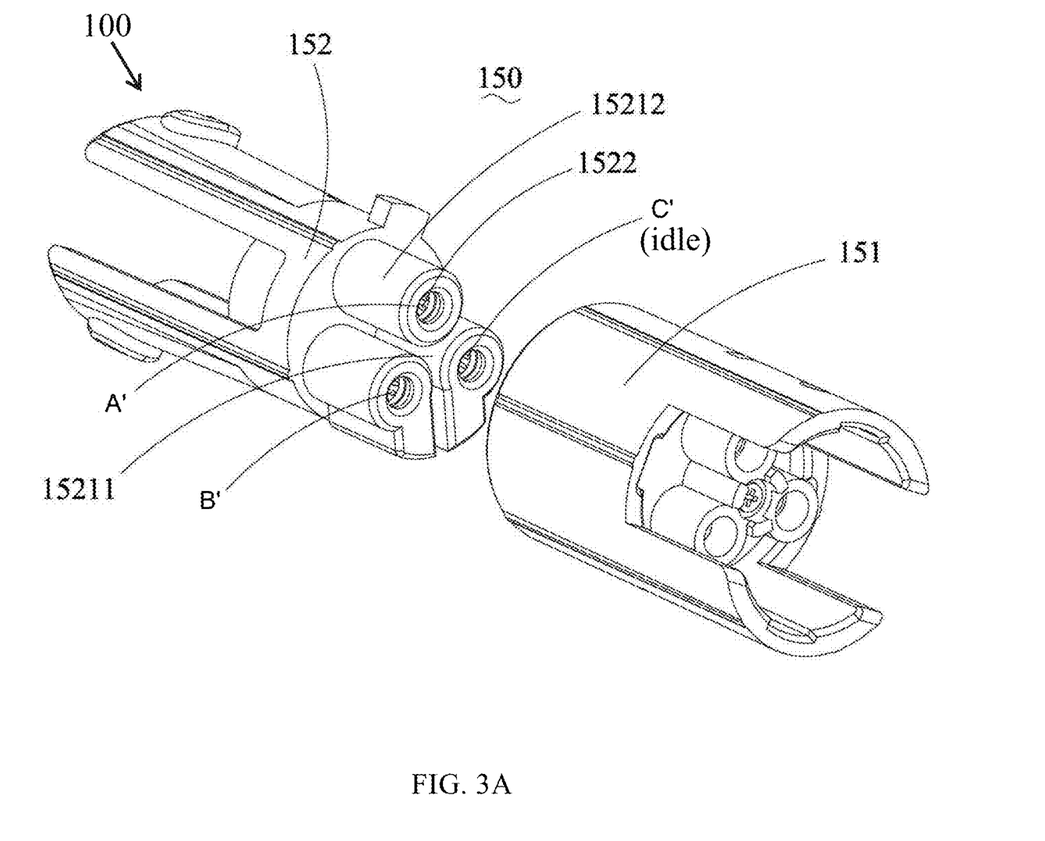
Figure 3B:
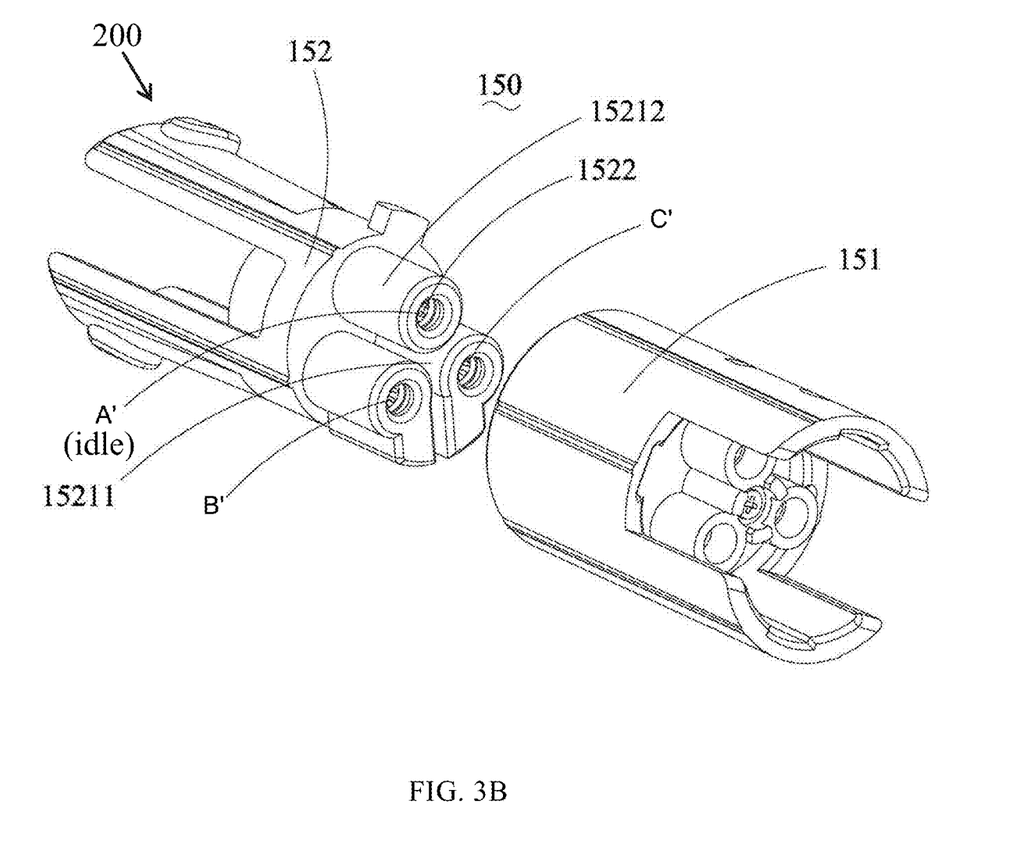
Figure 3C:
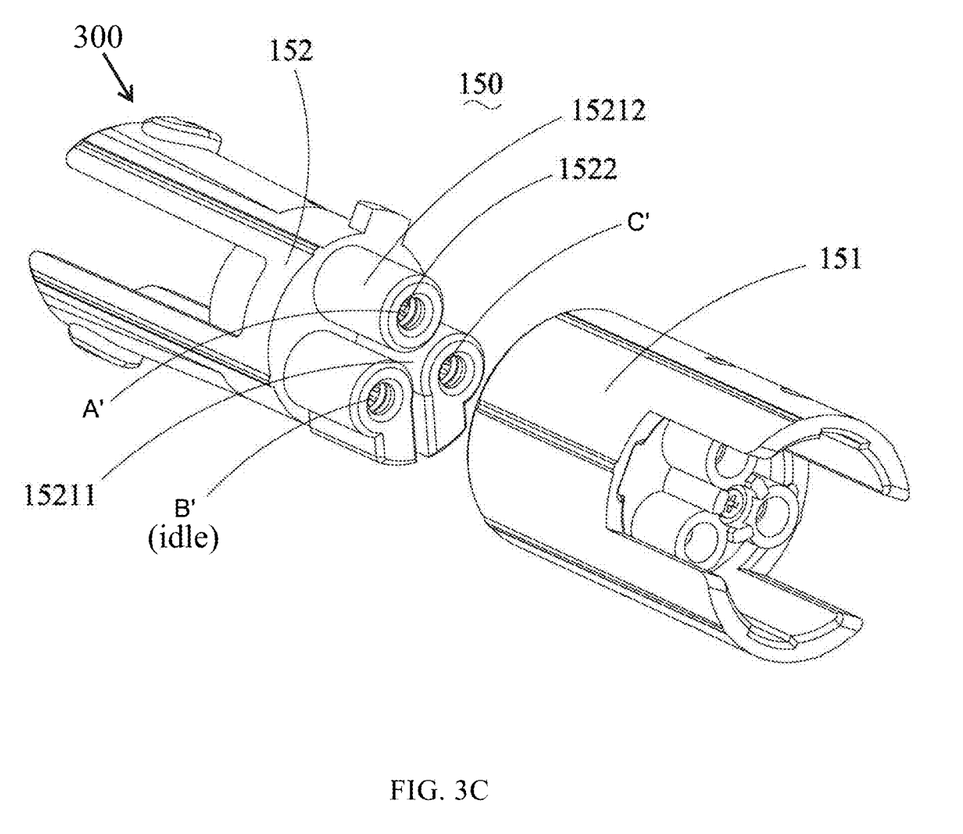

Please refer to FIG. 1, FIG. 2 and FIG. 3, the disclosure shows a power tool system 1 which includes a first power tool 100, a second power tool 200, and a third power tool 300. The first power tool 100 includes a first working assembly 110, a first operating rod 120, a first battery assembly 130, a first operating handle assembly 140 and a first connector 150. The first working assembly 110 is used to perform the functions of the first power tool 100. In this embodiment, the first working assembly 110 is a chain saw, but in other embodiments, the first working assembly 110 may also be a working assembly that performs other functions, which is not limited in the disclosure. The first operating rod 120 includes a first connecting rod 121 and a second connecting rod 122 matched with the first connecting rod 121. The first working assembly 110 is arranged at one end of the first connecting rod 121. A first fixing member 1211 is provided at one end of the first connecting rod 121 away from the first working assembly 110. The first battery assembly 130 and the first operating handle assembly 140 are fixedly installed at one end of the second connecting rod 122. A second fixing member 1221 is provided at one end of the second connecting rod 122 away from the first battery assembly 130. The first fixing member 1211 and the second fixing member 1221 cooperate to fix the first connecting rod 121 and the second connecting rod 122 together to form an operating rod. In this embodiment, the first fixing member 1211 is a screw sleeve provided with internal threads, and the second fixing member 1221 is a screw provided with external threads. Of course, it can be understood that the first connecting rod 121 and the second connecting rod 122 can be fixed together in a variety of ways, and the screw sleeve and the screw are only one of the embodiments. The disclosure does not limit the specific structure of the first fixing member 1211 and the second fixing member 1221. In other embodiments, in order to avoid relative rotation between the first connecting rod 121 and the second connecting rod 122, the first connecting rod 121 is further provided with a first rotation stopper (not shown), and the second connecting rod 122 is provided with a second rotation stopper (not shown), so that the first connecting rod 121 and the second connecting rod 122 cannot rotate relative to each other through the cooperation of the first rotation stopper and the second rotation stopper.

Figure 5:
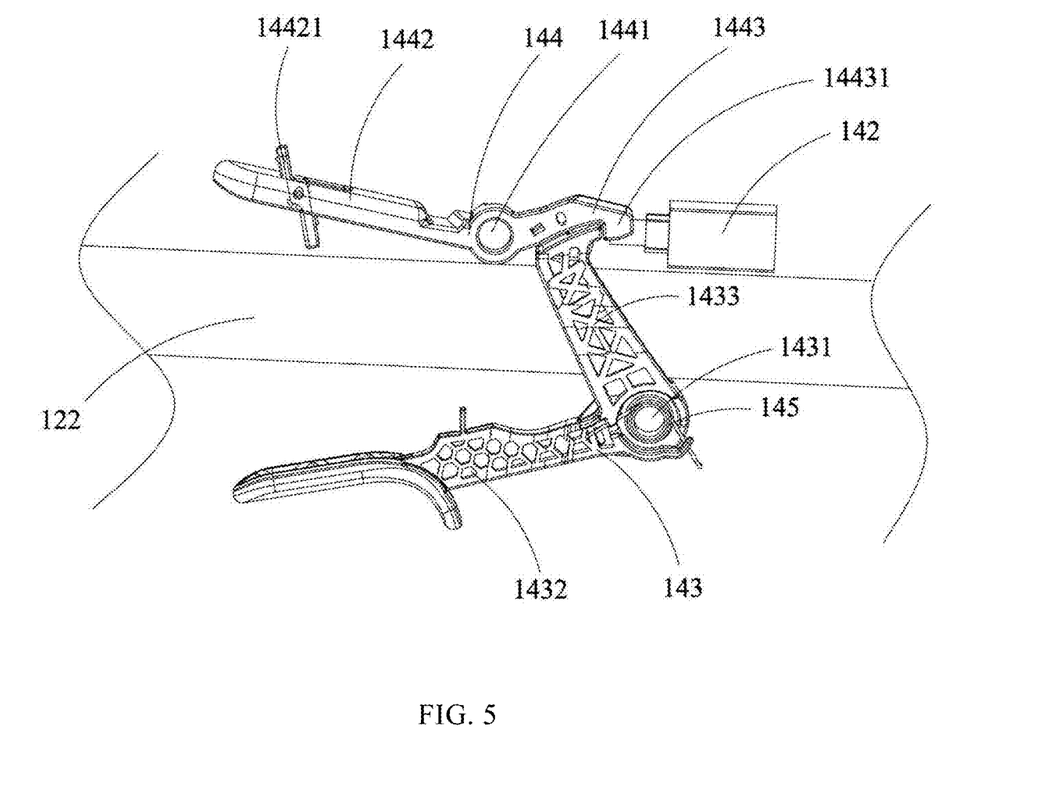
FIG. 5 is a schematic diagram of a cooperation of a second connecting rod, a first micro switch, a first trigger and a first self-locking member.

Please refer to FIG. 1, the first battery assembly 130 is used to provide power to the first working assembly 110. The first operating handle assembly 140 is used to control the operation of the first working assembly 110. Please refer to FIG. 1 and FIG. 5, the first operating handle assembly 140 includes a handle housing 141, a first micro switch 142, a first trigger 143 and a first self-locking member 144. The first micro switch 142 is used to control the on/off of the electrical connection between the first battery assembly 130 and the first working assembly 110. The first trigger 143 is pivotally mounted on the handle housing 141 through a first pivoting member 1431, and includes an operating arm 1432 and a resisting arm 1433 which are located on both sides of the first pivoting member 1431. When the user presses the operating arm 1432, the first trigger 143 rotates about the first pivoting member 1431, so that the resisting arm 1433 resists the first micro switch 142, thereby causing the first battery assembly 130 and the first working assembly 110 to be electrically connected. The connection enables the first working assembly 110 to start working. In this embodiment, the first pivoting member 1431 is a pivot hole, but in other embodiments, the first pivoting member 1431 may also be a pivot. The first operating handle assembly 140 further includes an elastic element 145 that cooperates with the first trigger 143. When the user presses the operating arm 1432, the elastic element 145 is elastically deformed under the action of the operating arm 1432; when the user releases the operating arm 1432, the operating arm 1432 is reset under the action of the elastic element 145. The first self-locking member 144 is pivotally mounted on the handle housing 141 through a second pivoting member 1441, and includes a pressing arm 1442 and a locking arm 1443 which are located on both sides of the second pivoting member 1441. In this embodiment, the second pivoting member 1441 is a pivot hole. In other embodiments, the second pivoting member 1441 may also be a pivot. A lock button 14421 is pivotally mounted on the pressing arm 1442. An end of the locking arm 1443 away from the second pivoting member 1441 is provided with a locking portion 14431 that cooperates with the resisting arm 1433. When the user rotates the lock button 14421 and makes the lock button 14421 abut the second connecting rod 122, the locking portion 14431 cooperates with the resisting arm 1433, so that the first trigger 143 cannot rotate about the first pivoting member 1431. At this time, the first trigger 143 is in a locked state. When the user turns the lock button 14421 and makes the lock button 14421 parallel to the second connecting rod 122, the locking portion 14431 is out of contact with the resisting arm 1433. At this time, the first trigger 143 can rotate about the first pivoting member 1431, and the first trigger 143 is in an unlocked state.

Figure 4:
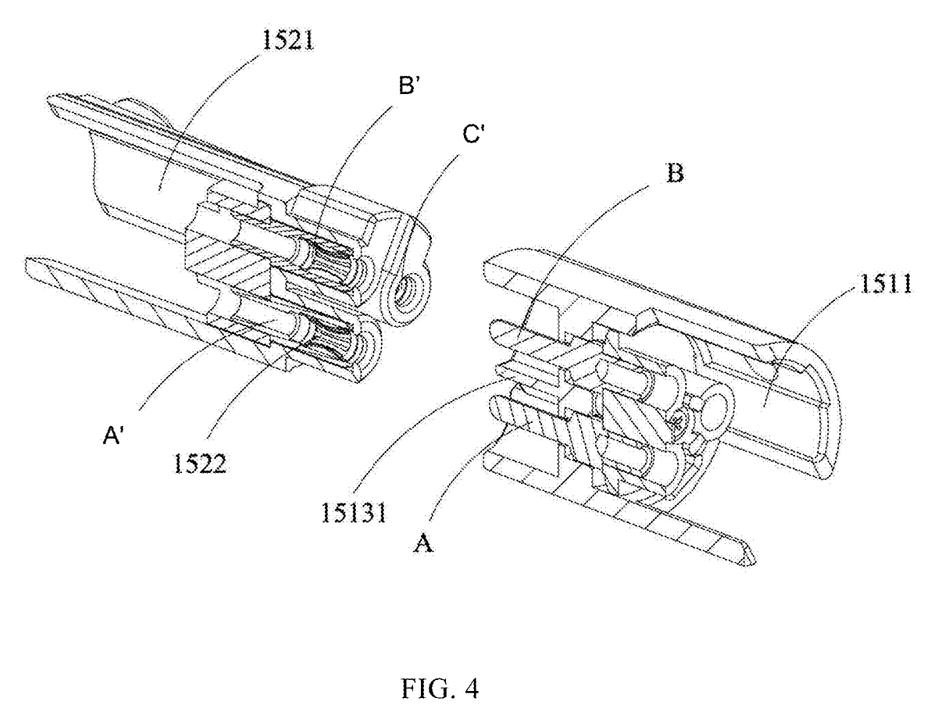
FIG. 4 is a schematic cross-sectional view of the first connector.

Please refer to FIGS. 2, 3 and 4, the first connector 150 includes a first connector portion 151 arranged on an end of the first connecting rod 121 away from the first working assembly 110 and a second connector portion 152 arranged on the second connecting rod 122 away from the first battery assembly 130. The first connector portion 151 includes a first insulating body 1511 and a first terminal group 1512 disposed on the first insulating body 1511. The first insulating body 1511 is provided with a first receiving groove 1513 for receiving the second connector portion 152. The first receiving groove 1513 is a non-rotationally symmetrical figure with respect to the axis of the first connecting rod 121, so that the connection mode of the first connector portion 151 and the second connector portion 152 is unique, that is, the connector portion 151 cannot be connected with the second connector portion 152 is after rotating about the axis of the first connecting rod 121 by an angle α. The angle α is greater than 0 degrees and less than 360 degrees. The first terminal group 1512 includes an A terminal, a B terminal, and a C terminal. A, B, and C are only used to distinguish different conductive terminals. The A terminal and the B terminal are connected to the positive and negative electrodes of the working assembly 110, and the C terminal is idle. Although in this embodiment, the first terminal group 1512 only includes three terminals, in other embodiments, the number of terminals of the first terminal group 1512 can be set as needed.

Please refer to FIG. 2, FIG. 3 and FIG. 4, the second connector portion 152 includes a second insulating body 1521 and a second terminal group 1522 disposed on the second insulating body 1521. The second terminal group 1522 includes an A' terminal matched with the A terminal, a B' terminal matched with the B terminal, and a C' terminal matched with the C terminal. The A' terminal and the B' terminal are connected to the positive and negative electrodes of the first battery assembly 130, and the C' terminal is idle. When the first connector portion 151 and the second connector portion 152 are connected to each other, the A terminal is electrically connected to the A' terminal, and the B terminal is electrically connected to the B' terminal, so that the first battery assembly 130 can provide power to the first working assembly 110.

A first limiting member 15131 is provided in the first receiving groove 1513, and the second insulating body 1521 is provided with a second limiting member 15211 matching the first limiting member 15131. The first limiting member 15131 and the second limiting member 15211 cooperate to make the connection between the first connector portion 151 and the second connector portion 152 unique. In this embodiment, the first limiting member 15131 is a partition plate, and the partition plate divides the first receiving groove 1513 into three receiving cavities 15132 that each receiving cavity 15132 receives only one terminal. The second insulating body 1521 is provided with three docking stations 15212. The docking station 15212 is received in the receiving cavity 15132 so that the first terminal group 1512 and the second terminal group 1522 are matched, thus the first battery assembly 130 can supply power to the first working assembly 110. The second limiting member 15211 is a positioning groove formed by a gap between the docking stations 15212 and matched with the partition plate.

In other embodiments, the A, B, and C terminals can also form an isosceles triangle, and the isosceles triangle is not an equilateral triangle. Such a configuration can also make the connection between the first connector portion 151 and the second connector portion 152 unique. Alternatively, the connections of the A, B, and C terminals form a triangle, and the triangle is a non-rotationally symmetrical figure. Of course, it is understandable that the sizes of the A, B, and C terminals can also be set to be inconsistent, so that the connection mode of the first connector portion 151 and the second connector portion 152 is unique. In fact, there are multiple structures that make the connection between the first connector portion 151 and the second connector portion 152 unique, which is not limited by the disclosure.

Please refer to FIG. 1, the second power tool 200 includes a second working assembly 210, a second operating rod 220, a second battery assembly 230, a second operating handle assembly 240, and a second connector (not shown). The second working assembly 210 is used to perform the function of the second power tool 200. In this embodiment, the second working assembly 210 is also a chain saw. However, in other embodiments, the functions of the first working assembly 110 and the second working assembly 210 may also be set to be different. For example, the first power tool 100 is a pole-type electric saw, and the second power tool 200 is a pole-type trimmer. The second battery assembly 230 is used to provide power to the second working assembly 210. The structure of the second operating rod 220 is substantially the same as the structure of the first operating rod 120, the second operating rod 220 includes a third connecting rod 221 and a fourth connecting rod 222 matched with the third connecting rod 221. One end of the third connecting rod 221 is provided with a second working assembly 210, and one end of the fourth connecting rod 222 is provided with a second battery assembly 230 and a second operating handle assembly 240. The structures of the second operating handle assembly 240 and the second connector are substantially the same as the structures of the first operating handle assembly 140 and the first connector 150. The second connector includes a first connector portion (not shown) disposed at an end of the third connecting rod 221 away from the second working assembly 210 and a second connector portion (not shown) disposed at an end of the fourth connecting rod 222 away from the second battery assembly 230 (not shown).

Please refer to FIG. 1, the third power tool 300 includes a third working assembly 310, a third operating rod 320, a third battery assembly 330, a third operating handle assembly 340, and a third connector (not shown). The third working assembly 310 is used to perform the function of the third power tool 300. The third working assembly 310 may be the same as the first working assembly 110 or the second working assembly 210, or may be set to be different. The third battery assembly 330 is used to provide power to the third working assembly 310. The structure of the third operating rod 320 is substantially the same as that of the first operating rod 120 and the second operating rod 220, and includes a fifth connecting rod 321 and a sixth connecting rod 322 matched with the fifth connecting rod 321. The fifth connecting rod 321 is provided with a third working assembly 310 at one end, and the sixth connecting rod 322 is provided with a third battery assembly 330 and a third operating handle assembly 340 at one end. The structures of the third operating handle assembly 340 and the third connector are substantially the same as the structures of the first operating handle assembly 140 and the first connector 150. The third connector includes a first connector portion (not shown) disposed at an end of the fifth connecting rod 321 away from the third working assembly 310 and a second connector portion (not shown) disposed at an end of the sixth connecting rod 322 away from the third battery assembly 330.

The difference between the first power tool 100, the second power tool 200, and the third power tool 300 is that: the voltage of the first battery assembly 130, the voltage of the second battery assembly 230, and the voltage of the third battery assembly 330 are different; the terminals electrically connecting the first connector 150 and the first working assembly 110, the terminals electrically connecting the second connector and the second working assembly 210, and the terminals electrically connecting to the third connector and the third working assembly 310 are different. With this configuration, the first power tool 100, the second power tool 200, and the third power tool 300 can share the same platform during production, thereby reducing design costs, production costs, and storage costs, and even if the power tools of different voltages are plugged into each other will not be energized, so as to avoid the problem of damage to the power tool due to incorrect insertion. In this embodiment, the voltage of the first battery assembly 130 is 24V, the voltage of the second battery assembly 230 is 40V, and the voltage of the third battery assembly 330 is 48V. However, it can be understood that, in other embodiments, the voltages of the first battery assembly 130, the second battery assembly 230, and the third battery assembly 330 can be set as required. In this embodiment, the A and B terminals of the first connector 150 are electrically connected to the first working assembly 110, and the A' and B' terminals are electrically connected to the first battery assembly 130. The B and C terminals of the second connector are electrically connected to the second working assembly 210, and the B' and C' terminals are electrically connected to the second battery assembly 230. The A and C terminals of the third connector are electrically connected to the third working assembly 310, and the A' and C' terminals are electrically connected to the third battery assembly 330. With this arrangement, when the user inserts the first connecting rod 121 of the first power tool 100 into the second connecting rod 222 of the second power tool 200, the user will find that the first working assembly 110 cannot be energized, thereby discovering the problem of incorrect insertion. At the same time, since the power cannot be energized in the case of incorrect insertion, the problem of damage to the electric tool due to incorrect insertion can be effectively avoided.

The first power tool 100, the second power tool 200, and the third power tool 300 of the power tool system 1 of the disclosure can not only share the same platform, thereby reducing design costs, production costs, and storage costs, but also the electric tools of different voltages will not be energized if they are inserted into each other, thereby avoiding the problem of damage to the electric tools due to incorrect insertion.

The above embodiments are only used to illustrate the technical solutions of the disclosure and not to limit them. Although the disclosure has been described in detail with reference to the preferred embodiments, those of ordinary skill in the art should understand that the technical solutions of the disclosure can be modified or equivalently replaced. Without departing from the spirit and scope of the technical solution of the disclosure.

What is claimed is:

1. A power tool system, comprising:
a first power tool with a first rated voltage, the first power tool comprising:
   a first connecting rod provided with a first working assembly at one end thereof,
   a second connecting rod provided with a first battery assembly at one end thereof, and
   a first connector, the first connector comprising:
      a first connector portion arranged on an end of the first connecting rod away from the first working assembly, and
      a second connector portion arranged on an end of the second connecting rod away from the first battery assembly; and
a second power tool with a second rated voltage, the second power tool comprising:
   a third connecting rod provided with a second working assembly at one end thereof,
   a fourth connecting rod provided with a second battery assembly at one end thereof, and
   a second connector, the second connector comprising:
      a first connector portion arranged on an end of the third connecting rod away from the second working assembly; and
      a second connector portion arranged on an end of the fourth connecting rod away from the second battery assembly;
wherein the first connector portions of the first power tool and the second power tool each includes at least A, B, and C three terminals, the second connector portions of the first power tool and the second power tool each includes A', B', and C' terminals corresponding to the A, B, and C terminals, at least one terminal of each of the first connector portions and the second connector portions of the first power tool and the second power tool is idle and not capable of supplying power to the first power tool and the second power tool, and terminals that are idle and not capable of supplying power to the first power tool and the second power tool are different; the terminals electrically connecting the first battery assembly and the first working assembly, and the terminals electrically connecting the second battery assembly and the second working assembly are different; and the first connector portions and the second connector portions are configured such that when the first connector portion is connected with the second connector portion, the A terminal is connected with the A' terminal, the B terminal is connected with the B' terminal, the C terminal is connected with the C' terminal,
wherein a voltage of the first battery assembly and a voltage of the second battery assembly are different; and the first rated voltage and the second rated voltage are different;
wherein the A and B terminals of the first connector portion of the first power tool are electrically connected to the first working assembly, the A' and B' terminals of the second connector portion of the first power tool are electrically connected to the first battery assembly, the C and C' terminals of the first power tool are idle and not capable of supplying power; and the first working assembly is energized only when the first connector portion of the first power tool is inserted into the second connector portion of the first power tool, and
wherein the B and C terminals of the first connector portion of the second power tool are electrically connected to the second working assembly; and the B' and C' terminals of the second connector portion of the second power tool are electrically connected to the second battery assembly, the A and A' terminals of the second power tool are idle and not capable of supplying power, and the second working assembly is energized only when the first connector portion of the second power tool is inserted into the second connector portion of the second power tool.

2. The power tool system of claim 1, wherein a connection of any two of the A, B, and C terminals constitutes an isosceles triangle, and the triangle is not an equilateral triangle.

3. The power tool system of claim 1, wherein a connection of any two of the A, B, and C terminals forms a triangle, and the triangle is a non-rotationally symmetrical figure.

4. The power tool system of claim 1, wherein at least one of the A, B, and C terminals is different in size from the other terminals.

5. The power tool system of claim 1, wherein
the first connector portion includes a first insulating body, and the first insulating body is provided with a first receiving groove for receiving the second connector portion;
the first receiving groove is a non-rotationally symmetrical figure with respect to an axis of the first connecting rod.

6. The power tool system of claim 1, wherein
the first connector portion is provided with a first limiting member, and the second connector portion is provided with a second limiting member; and
the first limiting member and the second limiting member cooperate to make a connection mode of the first connector portion and the second connector portion unique, and
the connector portion is not capable of being connected with the second connector portion after rotating about an axis of the first connecting rod by an angle a.

7. The power tool system of claim 6, wherein
the first connector portion includes a first insulating body, and the first insulating body is provided with a first receiving groove for receiving the second connector portion;
the first limiting member is arranged in the first receiving groove.

8. The power tool system of claim 7, wherein
the first limiting member is a partition plate, and the partition plate divides the first receiving groove into a plurality of receiving cavities, each receiving cavity receiving only one terminal;
the second limiting member is a positioning groove matched with the partition plate.

9. The power tool system of claim 1, wherein the voltage of the first battery assembly and the voltage of the second battery assembly are any two of 24V, 40V, and 48V.

10. The power tool system of claim 1, wherein the first power tool is a pole-type electric saw, and the second power tool is a pole-type trimmer.

11. The power tool system of claim 1, further comprising a third power tool, the third power tool comprising:
a fifth connecting rod provided with a third working assembly at one end thereof,
a sixth connecting rod provided with a third battery assembly at one end thereof, and
a third connector; wherein
the third connector includes a first connector portion arranged at an end of the fifth connecting rod away from the third working assembly and a second connector portion arranged at an end of the sixth connecting rod away from the third battery assembly;
wherein the A and C terminals of the first connector portion of the third power tool are electrically connected to the third working assembly, and the A' and C' terminals of the second connector portion of the third power tool are electrically connected to the third battery assembly, and the B and B' terminals of the third power tool are idle and not capable of supplying power; when connecting the third battery assembly and the third working assembly, the A terminal is electrically connected to the A' terminal, the C terminal is electrically connected to the C' terminal, and the B and B' terminals are connected and not capable of supplying power; and the third working assembly is energized only when the first connector portion of the third power tool is inserted into the second connector portion of the third power tool.

12. A power tool, comprising:
a first connecting rod provided with a first working assembly at one end thereof;
a second connecting rod provided with a first battery assembly at one end thereof; and
a connector, including:
a first connector portion arranged on an end of the first connecting rod, and
a second connector portion arranged on an end of the second connecting rod;
wherein the first connector portion includes at least A, B, and C three terminals, and the second connector portion includes A', B', and C' terminals corresponding to the A, B, and C terminals, and the C and C' terminals are idle and not capable of supplying power for the power tool;
and the first connector portion and the second connector portion are configured such that when the first connector portion is connected with the second connector portion, the A terminal is connected with the A' terminal, the B terminal is connected with the B' terminal, the C terminal is connected with the C' terminal,
wherein the A and B terminals of the first connector portion of the power tool are electrically connected to the first working assembly, the A' and B' terminals of the second connector portion of the power tool are electrically connected to the first battery assembly;
wherein the first working assembly is energized only when the first connector portion of the power tool is inserted into the second connector portion of the power tool.

13. The power tool of claim 12, wherein the first connector portion and the second connector portion are connected in a unique manner.

14. The power tool system of claim 1, wherein
when connecting the first battery assembly and the first working assembly, the A terminal is electrically connected to the A' terminal, the B terminal is electrically connected to the B' terminal, and the C terminal and the C' terminal are connected and not capable of supplying power; and
when connecting the second battery assembly and the second working assembly, the B terminal is electrically connected to the B' terminal, the C terminal is electrically connected to the C' terminal, and the A terminal and the A' terminal are connected and not capable of supplying power.

15. A power tool system, comprising:
a first power tool, the first power tool comprising:
- a first connecting rod provided with a first working assembly at one end thereof,
- a second connecting rod provided with a first battery assembly at one end thereof, and
- a first connector, the first connector comprising:
  - a first connector portion arranged on an end of the first connecting rod away from the first working assembly, and
  - a second connector portion arranged on an end of the second connecting rod away from the first battery assembly; and a second power tool, the second power tool comprising:
- a third connecting rod provided with a second working assembly at one end thereof,
- a fourth connecting rod provided with a second battery assembly at one end thereof, and
- a second connector, the second connector comprising:
  - a first connector portion arranged on an end of the third connecting rod away from the second working assembly; and
  - a second connector portion arranged on an end of the fourth connecting rod away from the second battery assembly;

wherein the first connector portions of the first power tool and the second power tool each includes at least A, B, and C three terminals, the second connector portions of the first power tool and the second power tool each includes A', B', and C' terminals corresponding to the A, B, and C terminals, and at least one terminal is idle and not capable of supplying power; the idle terminal not for power supply of the first power tool are different from the idle terminal not for power supply of the second power tool, the first or second power tool is not energized when the first connector portion of the first power tool is inserted into the second connector portion of the second power tool or the first connector portion of the second power tool is inserted into the second connector portion of the first power tool;

wherein a voltage of the first battery assembly and a voltage of the second battery assembly are different.

* * * * *